United States Patent [19]

Herskowitz

[11] 4,366,565
[45] Dec. 28, 1982

[54] LOCAL AREA NETWORK OPTICAL FIBER DATA COMMUNICATION

[76] Inventor: Gerald J. Herskowitz, 7 Clover St., Tenafly, N.J. 07670

[21] Appl. No.: 173,654

[22] Filed: Jul. 29, 1980

[51] Int. Cl.³ .......................... H04J 15/00; H04B 9/00
[52] U.S. Cl. ........................................ 370/1; 455/612; 350/96.15; 350/96.16
[58] Field of Search ........................ 370/1, 2, 3, 86, 69, 370/71; 455/612; 350/96.14, 96.15, 96.16, 96.18

[56] References Cited

U.S. PATENT DOCUMENTS

| | | | |
|---|---|---|---|
| 3,157,726 | 11/1964 | Hicks et al. | 455/612 |
| 3,633,034 | 1/1972 | Uchida | 370/3 |
| 3,761,716 | 9/1973 | Kapron et al. | 370/2 |
| 3,874,780 | 4/1975 | Love | 350/96.16 |
| 3,919,484 | 11/1975 | Maxemchuk | 370/86 |
| 4,262,171 | 4/1981 | Schneider et al. | 370/69 |

*Primary Examiner*—Douglas W. Olms
*Attorney, Agent, or Firm*—Pennie & Edmonds

[57] ABSTRACT

A method and apparatus are disclosed for high speed multiaccess data communication using guided wave components and angular division multiplexing for parallel optical signal transmission over a multimode optical fiber. A receiver at each station in the network comprises an optical coupler/demultiplexer, a pulse regenerator, an optical processor and detectors. The transmitter at each station comprises an array of lasers, a switching matrix for controlling emissions into the optical fiber and a multiplexer/coupler for coupling the laser emissions to the multimode optical fiber. The optical processor is directly coupled to the switching matrix. Preferably, the multiplexer/coupler comprises a graded-index planar lens, one major surface of which abuts the optical fiber and the other major surface of which is contacted by a plurality of single mode waveguides from the different lasers of the transmitter. As a result, the single mode signals introduced into the lens at different radial distances are coupled to different modal groups propagating in the optical fiber. The coupler/demultiplexer preferably comprises a graded-index lens and an array of concentric half-ring lasers. Annular cones of radiation propagating in the optical fiber are focused to an array of concentric rings near the half-ring lasers where they are converted into linear beams propagating in single mode guided wave structures.

18 Claims, 9 Drawing Figures

LOCAL AREA NETWORK OPTICAL FIBER DATA COMMUNICATION

BACKGROUND ART

A method and apparatus are disclosed for high speed multiple-access data communication. High speed optical guided wave components and angular division multiplexing are used to obtain parallel optical signal transmission and processing in routing data packets between host computers.

Multiple-access data networks have been realized in the prior art using multimode optical fiber at data rates up to 100 Mbits/s. See, for example, E. Rawson and R. Metcalfe, "Fibernet: Multimode Optical Fibers for Local Computer Networks," *IEEE Trans. Comm.*, COM-26, No. 7, 983–990 (July 1978); E. G. H. Lean, "Multimode Fiber Devices for Optical Fiber Links, Printing, and Display," *Ibid.*, 962–967; J. D. Crow, "(GaAl)As Laser Requirements for Local Attached Data Link Applications," *IBM Journ. of Res. and Div.*, 23, No. 5, 576–584 (September 1979). In such networks, passive components of low insertion loss, e.g., biconically-tapered, reflective, and transmissive star configurations have been used to perform various data distribution functions. See, for example, B. S. Kawasaki and K. O. Hill, "Low-Loss Access Coupler for Multimode Optical Fiber Distribution Networks," *Appl. Opt.*, 16, No. 7, 1794–95 (July 1977); M. Hudson and F. Thiel, "The Star Coupler: A Unique Component for Multimode Optical Waveguide Communications Systems," *Appl. Opt.*, 13, No. 11, 2540–2545 (Nov. 1974); T. Ozeki and B. S. Kawasaki, "New Star Coupler Compatible with Single Multimode-Fiber Data Links," *Electronics Lett.*, 12, No. 6, 151–152 (March 1976); M. K. Barnoski, "Design Considerations for Multiterminal Networks," in *Fundamentals of Optical Fiber Communications* (Ed. M. K. Barnoski) (Academic Press, New York, 1976). These networks are effective for interconnecting computers and other data equipment operating at speeds consistent with present technology, i.e., 30–50 nanosecond memory cycle times. However, the situation will change rapidly when higher-speed computers with memories approaching one nanosecond cycle times, such as a cryogenic memory composed of Josephson junctions capable of six picosecond switching times, are available for connection to data networks. Optical data networks will then have to operate efficiently at the Gbit/sec. information-carrying capacity of high quality optical fiber. See T. Li, "Optical Fiber Communication—The State of the Art," *IEEE Trans. Comm.*, Com-26, No. 7, 946–955 (July 1978).

Extremely high-speed computer networks will employ guided optical wave components such as modulators, switches, logic gates, amplifiers, and couplers fabricated from a wide range of materials. For example, recently reported logic elements with propagation delays in the 20–40 psec./gate range operate at 5 volts, compatible with electronic logic gates (TTL, etc.). H. F. Taylor, "Guided Wave Electrooptic Devices for Logic and computation," *Appl. Opt.*, 17, No. 5, 1493–1498 (May 1978). These elements, assembled to form integrated optical logic circuits (IOLC's) are therefore suited to operate at the interface between extremely high-speed computers and high-capacity fiber optic data networks.

Figure 1:
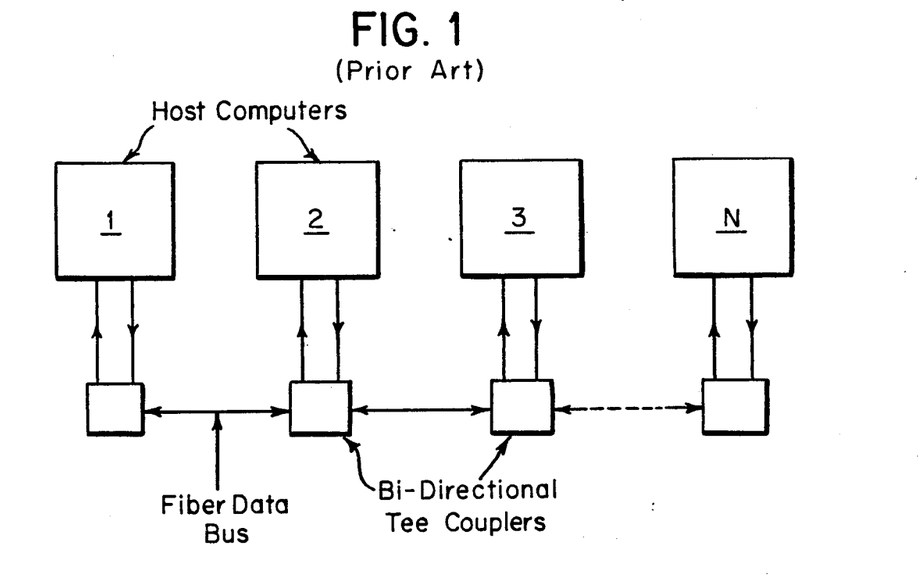
FIGS. 1, 2 and 3 are schematic illustrations of conventional optical fiber communication networks of the prior art.

To take maximum advantage of the guided wave components suited to perform the functions required at these interfaces, it is also necessary to consider the network configuration. Several alternative network configurations shown in FIGS. 1, 2 and 3 have been examined by the designers of Fibernet to provide a distributed packet switching system. R. M. Metcalfe and D. R. Boggs, "Ethernet: Distributed Packet Switching for Local Computer Networks," *Comm. ACM*, 19, No. 7, 395 (July 1976). These systems, however, are limited. The single-fiber bidirectional passively teed network of FIG. 1 appears to be limited by insertion splice and connector losses, making the number of stations unattractively low. Reflections at connectors, splices and tees would interfere with station monitoring or other control functions required of a distributed packet switching system.

Figure 2:
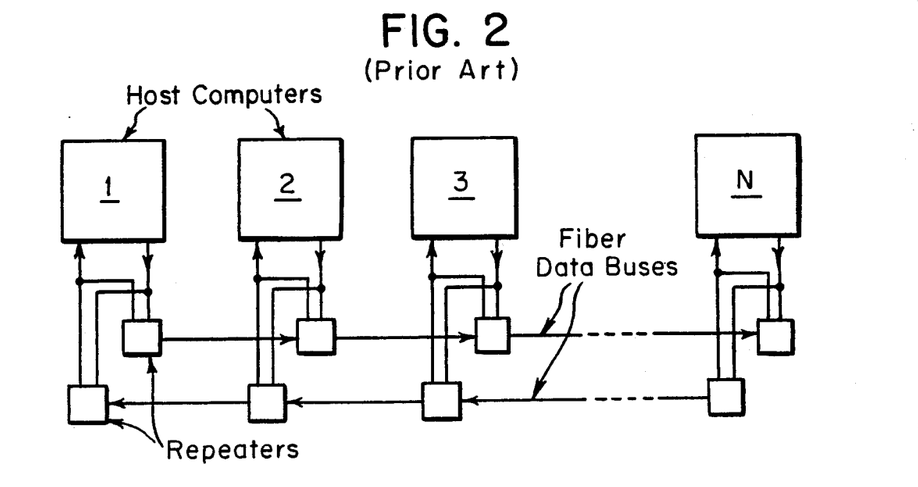
Figure 3:
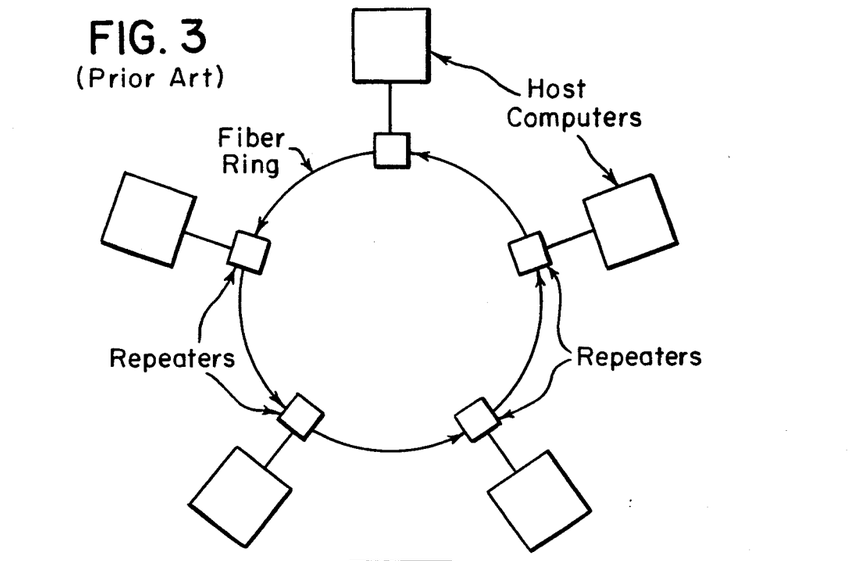

In the unidirectional repeatered networks of FIGS. 2 and 3, active optical guided wave components are required for use in the interface to match an extremely high-speed computer capability to the high fiber bandwidth. The active data network of FIG. 2 uses separate fibers for each direction, and requires that the host computer determine whether the packet is addressed to it, or if the packet is to continue on to another destination. This decision-making capability requires processing time from the host computer, thus reducing its efficiency and the network capacity. Alternatively, as shown in FIG. 3, a unidirectional repeatered loop network has been proposed, fashioned after the Irvine Ring. Neither system has developed much interest apparently because the repeaters use active components with the usual reliability problems as well as the difficulty of supplying power to remote locations.

SUMMARY OF THE INVENTION

I have found that an improved optical waveguide communication system can be implemented using high speed guided wave optical devices and angular division multiplexing to obtain parallel optical signal transmission and processing in routing data messages or packets between host computers. In accordance with a preferred embodiment of my invention, an optical communication system comprises a plurality of stations which are linked together by a multimode optical fiber to form a looped network. At each station there is at least one host computer which is interfaced to the multimode optical fiber by a receiver and a transmitter. Each receiver comprises an optical coupler/demultiplexer, a pulse regenerator, an optical processor and detectors. Each transmitter comprises an array of lasers, a switching matrix for controlling laser emission into the optical fiber and a multiplexer/coupler for coupling the laser emissions to the multimode optical fiber. As part of my invention, the optical processor is directly connected to the switching matrix so that data packets may be forwarded through the looped network without being rerouted through the station computer.

In accordance with my invention, demultiplexed signals are coupled to the optical pulse regenerator where signals having more than a threshold level are amplified and reshaped. Crosstalk between multiplexed channels having levels below this threshold is suppressed, thus producing easily distinguishable digital signals for the optical processor. This processor, consisting of optical circuits and detectors, determines the packet destination and routes it to the host computer to which it is addressed. If addressed to the host computer of the particular station the message is detected and inputted to the host. Otherwise, the entire packet is detected and routed to the lasers and optical switching matrix for multiplexing and retransmission along the fiber to its destination. If the packet is addressed to the host computer, a response packet is generated by it after processing. This new packet is routed to the optical switching matrix under host computer control and then to the multiplexer/coupler for transmission to the fiber ring.

The optical processor and switching matrix consist of single mode guided optical wave components for high speed and efficiency; and these components determine the speed of the packet address recognition and routing. The multiplexer/coupler must combine the single mode signals from the switching matrix and couple them to a multimode fiber. I have found that an efficient method of combining single mode signals on a multimode fiber is by angular division multiplexing. This technique for combining single mode signals on a multimode fiber is based upon the property of multimode optical fibers to transmit power simultaneously in discrete groups of angularly separated guided modes. In this way several bits of data are transmitted simultaneously on parallel channels, thus multiplying the single optical fiber channel capacity by the number of bits of data which may be multiplexed. Parallel processing within the receiver and the transmitter may also be performed, further increasing the data-handling capacity.

As part of the inventive system, a multiplexer/coupler has been devised in which individual single mode signals are inserted into a planar waveguide at different radial distances from the optical axis of the waveguide. Near the point of insertion, the waveguide is formed so that its index of refraction decreases with the square of the distance from its optical axis, whereby the single mode signals introduced at different radial distances are coupled to different modal groups propagating in the waveguide, dependent on angular excitation.

As another part of the inventive system, a coupler/demultiplexer has been devised comprising a graded index lens and an array of concentric half-ring lasers. Each angularly separated guided mode propagates through an optical fiber as a discrete annular cone of radiation. The lens focuses the far field annular rings into the near field to produce an array of concentric rings focused on the array of concentric half-ring lasers. Each half-ring laser serves as a threshold device to reduce crosstalk, as an optical amplifier, and as a device for converting the output ring pattern from the fiber to linear propagation into guided wave structures.

As will be apparent, the above-described system of my invention provides a more efficient sharing of bandwidth among stations and uses only a single fiber, an important consideration for longer distance netweoks. Another important advantage of this configuration is that the repeater contains intelligence for packet routing. Having the repeater in the loop also facilitates the use of angular division multiplexing.

BRIEF DESCRIPTION OF THE DRAWINGS

These and other objects, feature, elements and advantages of my invention will be readily apparent from the following detailed description of this invention in which.

BEST MODE FOR CARRYING OUT THE INVENTION

Figure 4:
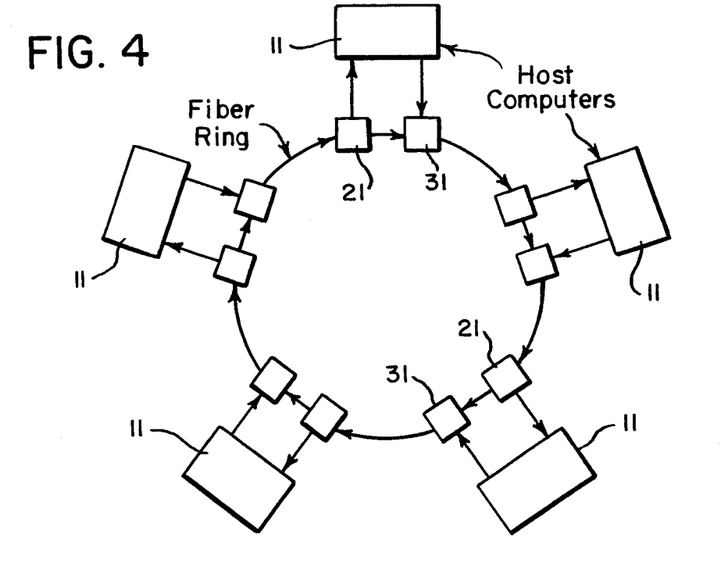
FIG. 4 is a schematic illustration of an illustrative embodiment of an optical fiber communication network of my invention.

As shown in FIG. 4, a preferred embodiment of the optical data communication system of the present invention is a multi-access network comprising a plurality of stations at each of which there is at least one host computer 11 and a multimode optical fiber 15 which links the stations together to form a looped network. In this system, packets of data are transmitted between stations with each packet containing the address of the station to which is being sent. Each computer is interfaced to the multimode optical fiber by a receiver 21 and a transmitter 31 which contain significant processing capabilities. As shown in FIG. 4, each receiver 21 is also directly connected to the transmitter.

Figure 5:
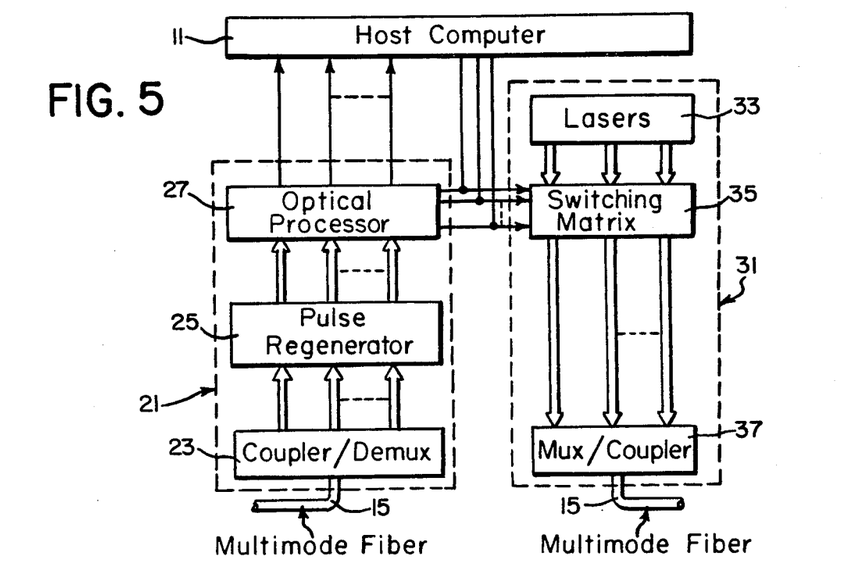
FIG. 5 is a schematic illustration of an illustrative embodiment of one station of the network of FIG. 4.

As shown in more detail in FIG. 5, the receiver 21 of each station comprises an optical coupler/demultiplexer 23, a pulse regenerator 25, and an optical processor 27. Each transmitter 31 comprises an array of CW lasers 33, a switching matrix 35 for controlling emission from said lasers to said optical fibers and a multiplexer/optical coupler 37 for coupling the laser emissions to the multimode optical fiber. As described more fully below, the multiplexer is an angular division multiplexer and the demultiplexer is an angular division demultiplexer.

In operation, demultiplexed signals are coupled to an optical pulse regenerator 25; and those signals having a level above a threshold are amplified and reshaped. Crosstalk between multiplexed channels having levels below this threshold is suppressed, thus producing easily distinguishable optical signals for optical processor 27. This processor, consisting of optical logic circuits and detectors, determines the packet destination and routes it to the host computer to which it is addressed. If addressed to the host computer of the particular repeater, the message is detected by a suitable array of photodetectors and inputted to the host. Otherwise, the entire packet is detected and routed to optical switching matrix 35 for modulation of the CW output of lasers 33 and subsequent multiplexing and retransmission along fiber 15 to its destination. If the packet is addressed to the host computer, a response packet is generated by it after processing. This new packet is routed by the host computer to optical switching matrix 35 for modulation of the output of lasers 33 and eventual transmission by the fiber ring.

Numerous configurations of optical processor 27, lasers 33, and switching matrix 35 may be used in the practice of the invention. As will readily be apparent, in such configurations, switching matrix 35 operates in response to signals from optical processor 27 and/or the host computer to control simultaneously the propagation of electromagnetic radiation from a plurality lasers 33 to optical fiber 15. For high speed and efficiency optical processor 27 and switching matrix 35 consist of single mode guided wave optical components. Optical processor 27 comprises optical logic gates described, for example, in H. F. Taylor, "Guided wave electrooptic devices for logic and computation," *Appl. Opt.*, 17, No. 10, 1493–1498 (May 15, 1978). The logic required to use such gates to determine packet destination is similar to that used with conventional electronic gates. Lasers 33 and the elements of switching matrix 35 are likewise well known. For example, the lasers could be 50 mW AlGaAs lasers having an output wavelength in the 0.8–0.9 micrometer ($\mu$m) region. Preferably, however, the lasers should be InGaAsP lasers having an output wavelength in the 1.1–1.7 $\mu$m region since fiber optic losses are lower at various points in this region. Illustratively, the switching matrix may be made of an array of electrooptic directional couplings, such as that described in J. C. Shelton, et al., "Rib waveguide switches with MOS electrooptic control for monolithic integrated optics in GaAsAl$_x$Ga$_{1-x}$As," *Appl. Opt.*, 17, No. 16, pp. 2548–2555, (Aug. 15, 1978). Switching matrix 35 are implemented with single-mode devices and the lasers are coupled to multiplexer/coupler 37 via single-mode waveguides. Obviously, there should be as many lasers, modulators and waveguides as there are separate channels available in the optical fiber through angular division multiplexing.

The multiplexer/coupler must combine the single mode signals from the switching matrix and couple them to a multimode fiber. I have found that an efficient method of combining single mode signals on a multimode fiber is by angular division multiplexing. This technique for combining single mode signals on a multimode fiber is based upon the property of multimode optical fibers to transmit power in discrete groups of angularly separated groups of guided modes. As is well known, multimode optical fibers have an inherent characteristic of propagating optical energy in the form of discrete modal groups; and it can be shown that fibers having a diameter on the order of 150 to 200 $\mu$m can support several hundred such discrete modal groups. After only a short distance of propagation in the fiber each of these modes propagates as an annular cone of radiation. Angular division multiplexing is a matter of exciting and detecting these annular cones. Since crosstalk between modes decreases with the inverse fourth power of the separation between the modes, angular excitation preferably is spaced to allow for at least one idle channel between adjacent angular modal groups used for multiplexing.

Figure 6:
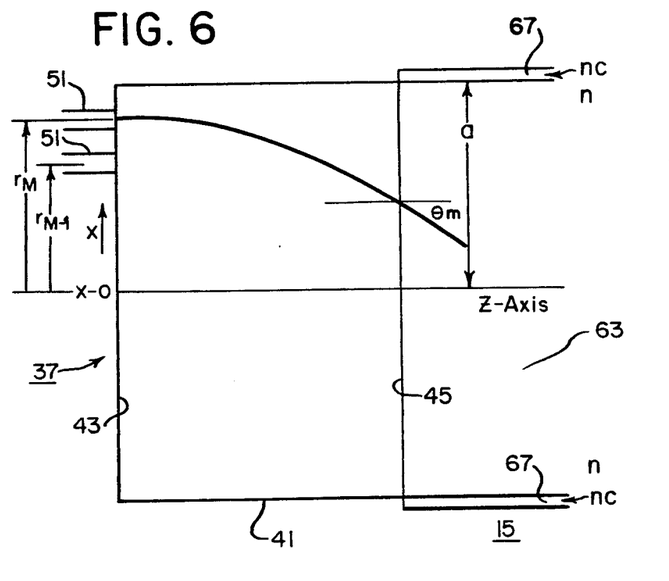
FIG. 6 is a schematic illustration of a multiplexer/coupler of FIG. 5.

An illustrative embodiment of multiplexer/coupler 37 is depicted in FIG. 6. As shown therein, multiplexer/coupler 37 comprises a planar lens 41 having first and second major surfaces 43, 45. An array of parallel rectangular optical waveguides 51 contact surface 43 of lens 41. Waveguides 51 are single mode optical waveguides for low loss transmission of radiation from lasers 33 (not shown in FIG. 6). Surface 45 of lens 41 abuts the end of optical waveguide 15 which preferably is a step-index multimode optical fiber having a core 63 of index of refraction n and a cladding 67 of index refraction n$_c$. As shown in FIG. 6, the direction of propagation in the optical fiber is along the z-axis and the coordinate system is centered on the optical axis of the fiber. The planar lens has a parabolic index of refraction profile of the form $$n(x) = n(1 - \tfrac{1}{2}bx^2) \quad (1)$$

where $\tfrac{1}{2}bx^2 \ll 1$ to minimize radiation losses. Thus, the index of refraction in the lens decreases with the square of the radial distance from the optical axis of the fiber. This graded planar waveguide structure behaves as a lens-like medium and couples energy from the parallel optical waveguides 51 emanating from the switching matrix into the optical fiber at a particular angle $\theta_m$, depending upon the radial distance $r_m$ from the fiber axis to the individual input guide 51. The behavior of optical radiation through this lens-like medium may be described by the paraxial ray equation.

$$\frac{\partial^2 x}{\partial z^2} = \frac{1}{n}\frac{\partial n}{\partial x} \quad (2)$$

where x=0 on the optical axis of the fiber and z is the direction of propagation. The angle of excitation, $\theta_m$, may be related to $r_m$ by solving Eq. (13) for the parabolic refractive index profile of Eq. (12)

$$\theta_m = r_m \sqrt{b} \sin \sqrt{b}\, d, \quad (3)$$

where d is the thickness of the lens. The angle, $\theta_m$, is designed to excite modes in each of the propagation angles inside the fiber by specifying the location of rectangular waveguides a distance $r_m$ from the fiber axis. Or, in terms of the fiber and lens parameters, $$r_m = \frac{m}{4a}[\sqrt{b} \sin \sqrt{b}\, d]^{-1} \quad (4)$$

The fiber radius a and operating wavelength are parameters to be optimized for minimum disperson. Since the dispersion-causing mode coupling coefficient $$D = (\Delta\theta)^2 d_{o'} = \left(\frac{n\lambda}{4a}\right)^2 d_{o'}$$

the largest practical value of fiber radius a should be used. At present such value is on the order of 150 to 200 $\mu$m. Since modal dispersion has been minimized through angular multiplexing, the material dispersion represents the largest contribution to the total dispersion. Therefore, the operating wavelength should be selected for minimum material dispersion and preferably is about 1.3 $\mu$m.

Figures 7, 8:
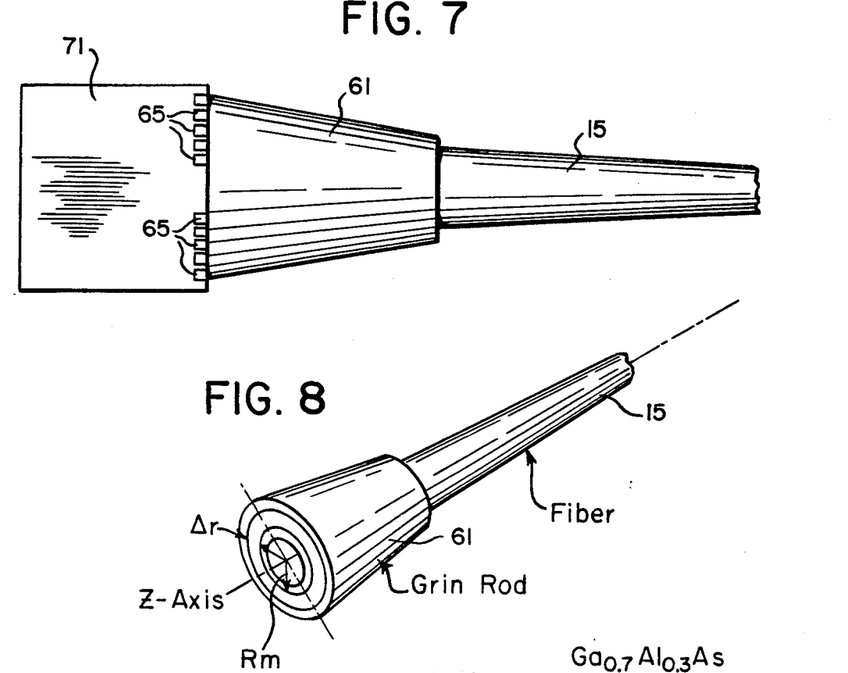
FIG. 7 is a schematic illustration of the coupler/demultiplexer of FIG. 5.
FIGS. 8 and 9 are schematic illustrations of details of the coupler/demultiplexer of FIG. 7.
Figure 9:
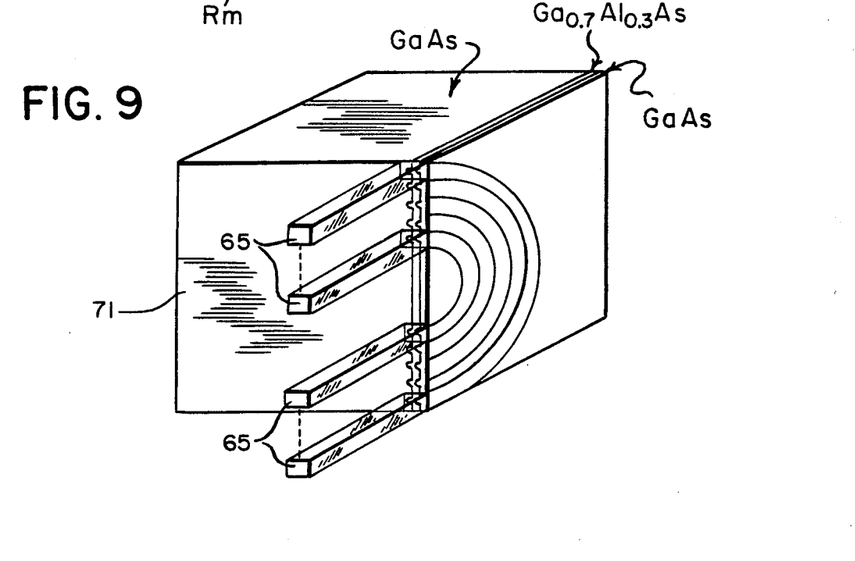

Since the annular cone distribution is formed only a short distance along the fiber, all three dimensions should be used to capture the maximum amount of energy available in each angle. An illustrative embodiment of a a coupler/demultiplexer 23 and an optical pulse regenerator 25 is illustrated in FIGS. 7 through 9. The device comprises a lens 61 which is used to focus the far field annular rings into the near field adjacent the end of the lens, an array of single mode waveguides 65, and an array of half ring lasers 71 which convert the radiation in the annular rings to radiation propagating in said waveguides. Since fiber 15 is axially symmetric, a graded index (GRIN) rod may be used as lens 61. See, E. W. Marchand, *Gradient Index Optics* (Academic Press 1978). This type of lens has a similar index of refraction profile as that used at the multiplexer/coupler and may be represented by a thin lens of focal length $$f = [\sqrt{b} \sin \sqrt{b}\, t]^{-1} \quad (5)$$

This gives rise to m concentric rings of optical radiation where m is the number of modal groups propagating in the optical fiber. As illustrated in FIG. 8, the separation of each ring is $\Delta r = \Delta\theta_{out} f$ and the center of each ring is located at a distance from the center of the circle $$R_m = m\Delta r, \quad (6)$$

where m is the complex mode number. Thus each ring contains the signal which propagated through waveguide 15 on a different angular mode. These rings may be magnified by choosing appropriate values for b and t. This provides the dimensions required for coupling to the half-ring lasers 71 of pulse regenerator 25.

Ring (and therefore, mode) selection and optical pulse regeneration is achieved using concentric half-ring lasers 71 which operate by light propagating along curved junctions. The condition required to obtain lasing along a curved junction yields a minimum bending radius which has been calculated and shown experimentally to be 0.4 mm for GaAs. The signal from each half-ring laser is coupled to optical processor 27 by one of waveguides 65, only some of which are shown in FIG. 9.

As will be apparent to those skilled in the art, numerous modifications may be made in the above described system and components. While it is preferred that the system be operated at a wavelength of approximately 1.3 μm so as to minimize transmission losses, costs, reliability and other factors may dictate the use of other operating wavelengths; and there is no intention to limit the use of the invention to the range of 0.8 to 1.7 μm. Again, while it is preferred that the optical components be integrated to the extent feasible in the state of the art, my invention may also be practiced using discrete components. In general, the techniques described above may be used widely with all manner of optical waveguides.

What is claimed is:

1. An optical data communication system comprising a plurality of stations linked together by a multimode optical waveguide to form an optical signal, each of said stations comprising:
    an array of lasers,
    a switching matrix for controlling the propagation of radiation from said lasers into said optical waveguide,
    a multiplexer/coupler for coupling radiation from said lasers to said waveguide, radiation from different lasers being coupled to different angular modes of propagation in said waveguide,
    a coupler/demultiplexer for demultiplexing radiation received at said station from said waveguide,
    an optical pulse regenerator coupled to said coupler/demultiplexer, said pulse regenerator having a threshold level above which the optical signal is optically amplified and reshaped and below which the signal is suppressed, and
    an optical processor to which is applied the optical signal from the pulse regenerator, said optical processor including optical logic circuits for detecting the address of data packets contained in signals transmitted along said optical waveguide and for routing said signals either to a host computer at said station or to said switching matrix.

2. The optical communication system of claim 1 wherein said waveguide is an optical fiber.

3. The optical data communication system of claim 1 wherein the waveguide is a multimode optical fiber and said multiplexer/coupler comprises:
    a planar lens having a first major surface which abuts the end of said multimode optical fiber, said planar lens having an index of refraction which decreases with the square of the radial distance from the optical axis of said fiber, and
    a plurality of optical waveguides contacting a second major surface of said planar lens at different radial distances from said optical axis, said optical waveguides transmitting radiation from said lasers to said planar lens.

4. An optical multiplexer/coupler for coupling single mode optical signals to a multimode optical waveguide said multiplexer/coupler comprising:
    a planar lens having a first major surface which abuts the end of said multimode optical waveguide, said planar lens having an index of refraction which decreases with the square of the radial distance from the optical axis of said waveguide, and
    a plurality of optical waveguides contacting a second major surface of said planar lens at different radial distances from said optical axis.

5. The optical multiplexer/coupler of claim 4 wherein said input waveguides are single mode rectangular waveguides.

6. The optical multiplexer/coupler of claim 4 wherein the index of refraction of the planar lens varies in accordance with the relation $n(x) = n(1 - \tfrac{1}{2} b\, x^2)$.

7. The optical multiplexer/coupler of claim 4 wherein the optical waveguide is an optical fiber.

8. An optical coupler/demultiplexer for demultiplexing multimode optical signals, said coupler demultiplexer comprising:
    a lens having a first major surface which abuts the end of a multimode optical waveguide, said lens having an index of refraction which decreases with the square of the radial distance from the optical axis of said fiber, said lens focusing discrete annular cones of radiation propagating within said fiber to annular rings near a second major surface of said lens,
    a plurality of half-ring lasers facing said second major surface of said lens and being aligned with a portion of the annular rings formed by said lens, and
    a plurality of optical waveguides disposed to transmit radiation from individual half-ring lasers.

9. The optical coupler/demultiplexer of claim 8 wherein the optical waveguides transmit radiation from said half-ring lasers to single mode waveguides.

10. The optical coupler/demultiplexer of claim 8 wherein the index of refraction of the planar lens varies in accordance with the relation $n(x) = n(1 - \tfrac{1}{2} b\, x^2)$.

11. The optical coupler/demultiplexer of claim 8 wherein the optical waveguide is an optical fiber.

12. An optical data communication system comprising a plurality of stations linked together by a step-index multimode optical waveguide, each of said stations comprising:
    an array of sources of optical electromagnetic radiation, means for controlling the propagation of radiation from said sources into said optical waveguide, means for coupling radiation from said sources to said waveguide, radiation from different sources being coupled to different angular modes of propagation in said step-index waveguide, means for demultiplexing radiation received at said station from said waveguide, and means for detecting said demultiplexed radiation.

13. In an optical data communication system comprising a plurality of stations linked together by a step-index multimode optical waveguide, a method of operating a station of said system comprising the steps of:

modulating a plurality of beams of optical electromagnetic radiation with information to be transmitted, coupling said modulated beams of radiation to said waveguide, radiation from different beams being coupled to different angular modes of propagation in said step-index waveguide, demultiplexing radiation received at said station from said waveguide, and detecting said demultiplexed radiation.

14. An optical data communication system comprising a plurality of stations linked together by a multimode optical waveguide, each of said stations comprising:

an array of sources of electromagnetic radiation, means for controlling the propagation of radiation from said sources into said optical waveguide to form an optical signal, a multiplexer/coupler for coupling radiation from said sources to said waveguide, radiation from different sources being coupled to different angular modes of propagation in said waveguide, a coupler/demultiplexer for demultiplexing radiation received at said station from said waveguide, an optical pulse regenerator coupled to said coupler/demultiplexer, said pulse regenerator having a threshold level above which the optical signal is optically amplified and reshaped and below which the signal is suppressed, and an optical processor to which is applied the optical signal from the pulse regenerator, said optical processor including optical logic circuits for detecting the address of data packets contained in signals transmitted along said optical waveguide and for routing said signals either to data processing equipment at said station or to said means for controlling the propagation of radiation from said sources.

15. The optical communication system of claim 14 wherein said waveguide is an optical fiber.

16. The optical data communication system of claim 14 wherein the waveguide is a multimode optical fiber and said multiplexer/coupler comprises:

a lens having a first major surface which abuts the end of said multimode optical fiber, said lens having an index of refraction which decreases with the square of the radial distance from the optical axis of said fiber, and a plurality of optical waveguides contacting a second major surface of said lens at different radial distances from said optical axis, said optical waveguides transmitting radiation from said sources of radiation to said lens.

17. An optical multiplexer/coupler for coupling single mode optical signals to a multimode optical waveguide said multiplexer/coupler comprising:

a lens having a first major surface which abuts the end of said multimode optical waveguide, said lens having an index of refraction which decreases with the square of the radial distance from the optical axis of said waveguide, and a plurality of optical waveguides contacting a second major surface of said lens at different radial distances from said optical axis.

18. The optical multiplexer/coupler of claim 17 wherein said input waveguides are single mode rectangular waveguides.

* * * * *

UNITED STATES PATENT AND TRADEMARK OFFICE
CERTIFICATE OF CORRECTION

PATENT NO. : 4,366,565
DATED : December 28, 1982
INVENTOR(S) : Gerald J. Herskowitz It is certified that error appears in the above-identified patent and that said Letters Patent are hereby corrected as shown below:

Column 7, line 48, after "waveguide" and before the comma, delete "to form an optical signal".

Column 7, line 53, after "guide" and before the comma, insert -- to form an optical signal -- .

Signed and Sealed this

Twenty-second Day of February 1983

[SEAL]

Attest:

GERALD J. MOSSINGHOFF

Attesting Officer    Commissioner of Patents and Trademarks